(12) United States Patent
Jeon et al.

(10) Patent No.: US 11,415,590 B2
(45) Date of Patent: Aug. 16, 2022

(54) METHOD AND APPARATUS WITH POSTURE ESTIMATION

(71) Applicants: Samsung Electronics Co., Ltd., Suwon-si (KR); SNU R&DB FOUNDATION, Seoul (KR)

(72) Inventors: Hyun Cheol Jeon, Suwon-si (KR); Chan Gook Park, Seoul (KR); Keechang Lee, Seongnam-si (KR); Jungmin Park, Seoul (KR); So Young Park, Busan (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 269 days.

(21) Appl. No.: 16/707,031

(22) Filed: Dec. 9, 2019

(65) Prior Publication Data
US 2020/0400704 A1    Dec. 24, 2020

(30) Foreign Application Priority Data

Jun. 24, 2019  (KR) .................. 10-2019-0074923

(51) Int. Cl.
*G01P 3/44* (2006.01)
*G01P 15/00* (2006.01)

(52) U.S. Cl.
CPC ............... *G01P 3/44* (2013.01); *G01P 15/00* (2013.01)

(58) Field of Classification Search
CPC .................................. G01P 3/44; G01P 15/00
See application file for complete search history.

(56) References Cited

U.S. PATENT DOCUMENTS

| 6,963,185 B2* | 11/2005 | Takenaka ............. B62D 57/032 318/568.12 |
| 7,697,234 B2 | 4/2010 | Higashino et al. |
| 2020/0060566 A1* | 2/2020 | Howard ................ A61B 5/374 |

(Continued)

FOREIGN PATENT DOCUMENTS

| JP | 2003-329705 A | 11/2003 |
| JP | 5846927 B2 | 1/2016 |
| KR | 10-0946676 B1 | 3/2010 |

(Continued)

OTHER PUBLICATIONS

Sabatini, A.M., "Quaternion-Based Extended Kalman Filter for Determining Orientation by Inertial and Magnetic Sensing", *IEEE Transactions on Biomedical Engineering*, Jul. 2006, vol. 53 Issue: 7 (1 page in English).

(Continued)

*Primary Examiner* — Elias Desta
(74) *Attorney, Agent, or Firm* — NSIP Law

(57) ABSTRACT

A processor-implemented posture determination method includes: estimating a rotational acceleration of a timepoint based on an angular velocity measured by a first sensor at the timepoint and a determined center of rotation of a previous timepoint; correcting an acceleration measured by a second sensor at the timepoint based on the rotational acceleration; and determining a center of rotation of the timepoint and a posture of the timepoint based on the corrected acceleration and an estimated posture of the timepoint.

25 Claims, 9 Drawing Sheets

(56) References Cited

U.S. PATENT DOCUMENTS

2021/0120178 A1\* 4/2021 Tanaka ............... H04N 5/23245

FOREIGN PATENT DOCUMENTS

KR 10-0968033 B1 7/2010
KR 10-2012-0121595 A 11/2012

OTHER PUBLICATIONS

Takeda R, et al., "Gait Posture Estimation Using Wearable Acceleration and Gyro Sensors", *Journal of Biomechanics,* Nov. 2009, 42(15), 2486-2494 (9 pages in English).
Soo Suh, Y., "Orientation Estimation Using a Quaternion-Based Indirect Kalman Filter With Adaptive Estimation of External Acceleration", *IEEE Transactions on Instrumentation and Measurement,* Dec. 2010, vol. 59 Issue: 12 (1 page in English).
Woo Kang C, et al., "A Human Motion Tracking Algorithm Using Adaptive EKF Based on Markov Chain", *IEEE Sensors Journal,* Dec. 2016, vol. 16 Issue: 24 (1 page in English).
Malinak P., et al., "Pure-Inertial AHRS with Adaptive Elimination of Non-Gravitational Vehicle Acceleration", *2018 IEEE/ION Position, Location and Navigation Symposium* (*PLANS*), Apr. 2018 (1 page in English).

\* cited by examiner

METHOD AND APPARATUS WITH POSTURE ESTIMATION

CROSS-REFERENCE TO RELATED APPLICATIONS

This application claims the benefit under 35 USC § 119(a) of Korean Patent Application No. 10-2019-0074923 filed on Jun. 24, 2019 in the Korean Intellectual Property Office, the entire disclosure of which is incorporated herein by reference for all purposes.

BACKGROUND

1. Field

The following description relates to a posture estimation method and apparatus.

2. Description of Related Art

A device may estimate a posture and provide a predetermined function based on the estimated posture. For example, automatic screen rotation technology of a smart phone may estimate a direction and a posture of a user viewing a screen, and determines an orientation of the screen based on the estimated direction and posture. As another example, a driver assistance apparatus may estimate a posture using a sensor disposed on an ankle of a user, and provide a driver assistance function.

A gyro sensor and an accelerometer may be used to estimate a posture of a device. The gyro sensor may sense a rotational motion of an object and measure an angular velocity generated by the rotational motion. The gyro sensor may measure the angular velocity by converting a Coriolis force generated by the rotational motion into an electrical signal. The accelerometer may sense and measure an acceleration applied to the object. The accelerometer may measure the acceleration with respect to x-axial, y-axial, and z-axial directions. The accelerometer, when in a stationary state, may sense an acceleration of a gravity direction and thus, may measure an acceleration of −g (gravitational acceleration) in the z-axial direction.

A Kalman filter may be a recursive filter which estimates a state of a linear dynamical system based on a measure including noise. The Kalman filter may estimate a current state based on a previously-measured value. The Kalman filter may perform a prediction operation and an update operation. In the prediction operation, the Kalman filter may estimate a value of a current state variable and an accuracy. When the current state variable is measured, the Kalman filter may update the current state variable by reflecting a difference between a current state variable predicted based on a state variable estimated previously and the measured current state variable, in the update operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented posture determination method includes: estimating a rotational acceleration of a timepoint based on an angular velocity measured by a first sensor at the timepoint and a determined center of rotation of a previous timepoint; correcting an acceleration measured by a second sensor at the timepoint based on the rotational acceleration; and determining a center of rotation of the timepoint and a posture of the timepoint based on the corrected acceleration and an estimated posture of the timepoint.

The determining of the posture of the timepoint may include: estimating a posture error of the timepoint based on the corrected acceleration and the estimated posture; and determining the posture of the timepoint based on the estimated posture and the estimated posture error.

The determining of the center of rotation of the timepoint may include: estimating a center of rotation error of the timepoint based on the corrected acceleration and the estimated posture; and determining the center of rotation of the timepoint based on the estimated center of rotation error.

The determining of the center of rotation of the timepoint and the posture of the timepoint may include: predicting a posture error of the timepoint and a center of rotation error of the timepoint from a posture error estimated at the previous timepoint and a center of rotation error estimated at the previous timepoint, based on the estimated posture of the timepoint; correcting the predicted posture error of the timepoint and the predicted center of rotation error of the timepoint based on the corrected acceleration and the estimated posture of the timepoint; and determining the posture of the timepoint based on the corrected posture error, and the center of rotation of the timepoint based on the corrected center of rotation error.

The predicting may include propagating a previous state including the posture error of the previous timepoint and the center of rotation error of the previous timepoint to a state including the posture error of the timepoint and the center of rotation error of the timepoint based on a Kalman filter based system model.

The method may include estimating the estimated posture of the timepoint by integrating angular velocities measured by the first sensor between the previous timepoint and the timepoint.

The estimating of the rotational acceleration of the timepoint may include: calculating an angular acceleration of the timepoint based on the angular velocity measured at the timepoint and an angular velocity measured at the previous timepoint; and estimating the rotational acceleration of the timepoint based on the angular velocity measured at the timepoint, the angular acceleration of the timepoint, and the center of rotation of the previous timepoint.

The estimating of the rotational acceleration of the timepoint may include retrieving, from a memory, either one or both of the determined center of rotation of the previous timepoint and an angular velocity measured by the first sensor at the previous timepoint.

The rotational acceleration may be an estimated rotation direction component of the acceleration measured by the second sensor at the timepoint.

The correcting may include removing a component corresponding to the rotational acceleration from among a plurality of components included in the acceleration measured at the timepoint.

The first sensor may include a gyro sensor, and the second sensor may include an accelerometer.

A non-transitory computer-readable storage medium may store instructions that, when executed by one or more processors, configure the one or more processors to perform the method.

In another general aspect, a posture estimation apparatus includes: one or more processors configured to: estimate a rotational acceleration of a timepoint based on an angular velocity measured by a first sensor at the timepoint and a determined center of rotation of a previous timepoint, correct an acceleration measured by a second sensor at the timepoint based on the rotational acceleration, and determine a center of rotation of the timepoint and a posture of the timepoint based on the corrected acceleration and an estimated posture of the timepoint.

For the determining of the posture of the timepoint, the one or more processors may be configured to: estimate a posture error of the timepoint based on the corrected acceleration and the estimated posture; and determine the posture of the timepoint based on the estimated posture and the estimated posture error.

For the determining of the center of rotation of the timepoint, the one or more processors may be configured to: estimate a center of rotation error of the timepoint based on the corrected acceleration and the estimated posture; and determine the center of rotation of the timepoint based on the estimated center of rotation error.

For the estimating of the center of rotation of the timepoint and the posture of the timepoint, the one or more processors may be configured to: predict a posture error of the timepoint and a center of rotation error of the timepoint from a posture error estimated at the previous timepoint and a center of rotation error estimated at the previous timepoint, based on the posture measured at the timepoint; correct the predicted posture error of the timepoint and the predicted center of rotation error of the timepoint based on the corrected acceleration and the estimated posture of the timepoint; and determine the posture of the timepoint based on the corrected posture error, and the center of rotation of the timepoint based on the corrected center of rotation error.

For the predicting, the one or more processors may be configured to propagate a previous state including the posture error of the previous timepoint and the center of rotation error of the previous timepoint to a state including the posture error of the timepoint and the center of rotation error of the timepoint based on a Kalman filter based system model.

The one or more processors may be configured to estimate the estimated posture of the timepoint by integrating angular velocities measured by the first sensor between the previous timepoint and the timepoint.

For the estimating of the rotational acceleration of the timepoint, the one or more processors may be configured to: calculate an angular acceleration of the timepoint based on the angular velocity measured at the timepoint and an angular velocity measured at the previous timepoint; and estimate the rotational acceleration of the timepoint based on the angular velocity measured at the timepoint, the angular acceleration of the timepoint, and the center of rotation of the previous timepoint.

For the estimating of the rotational acceleration of the timepoint, the one or more processors may be configured to retrieve, from a memory, either one or both of the center of rotation estimated at the previous timepoint and an angular velocity measured by the first sensor at the previous timepoint.

For the correcting, the one or more processors may be configured to remove a component corresponding to the rotational acceleration from among a plurality of components included in the acceleration measured at the timepoint.

The apparatus may include the first sensor and the second sensor, the first sensor may include a gyro sensor, and the second sensor may include an accelerometer.

The apparatus may be either one or both of a smart phone and a wearable device, and the one or more processors may be configured to control a function of the apparatus based on the determined center of rotation and posture of the timepoint.

The apparatus may further include a memory storing instructions that, when executed by the one or more processors, configure the one or more processors to perform the estimating of the rotational acceleration, the correcting of the acceleration, and the determining of the center of rotation and the posture of the timepoint.

In another general aspect, a processor-implemented posture estimation method includes: determining a center of rotation of an object at a first timepoint; determining an acceleration of the object at the second timepoint based on the determined center of rotation, an angular velocity of the object at the second timepoint measured by a first sensor, and an acceleration of the object at the second timepoint measured by a second sensor; and determining a center of rotation of the object at the second timepoint based on the determined acceleration.

Other features and aspects will be apparent from the following detailed description, the drawings, and the claims.

Figure 1:
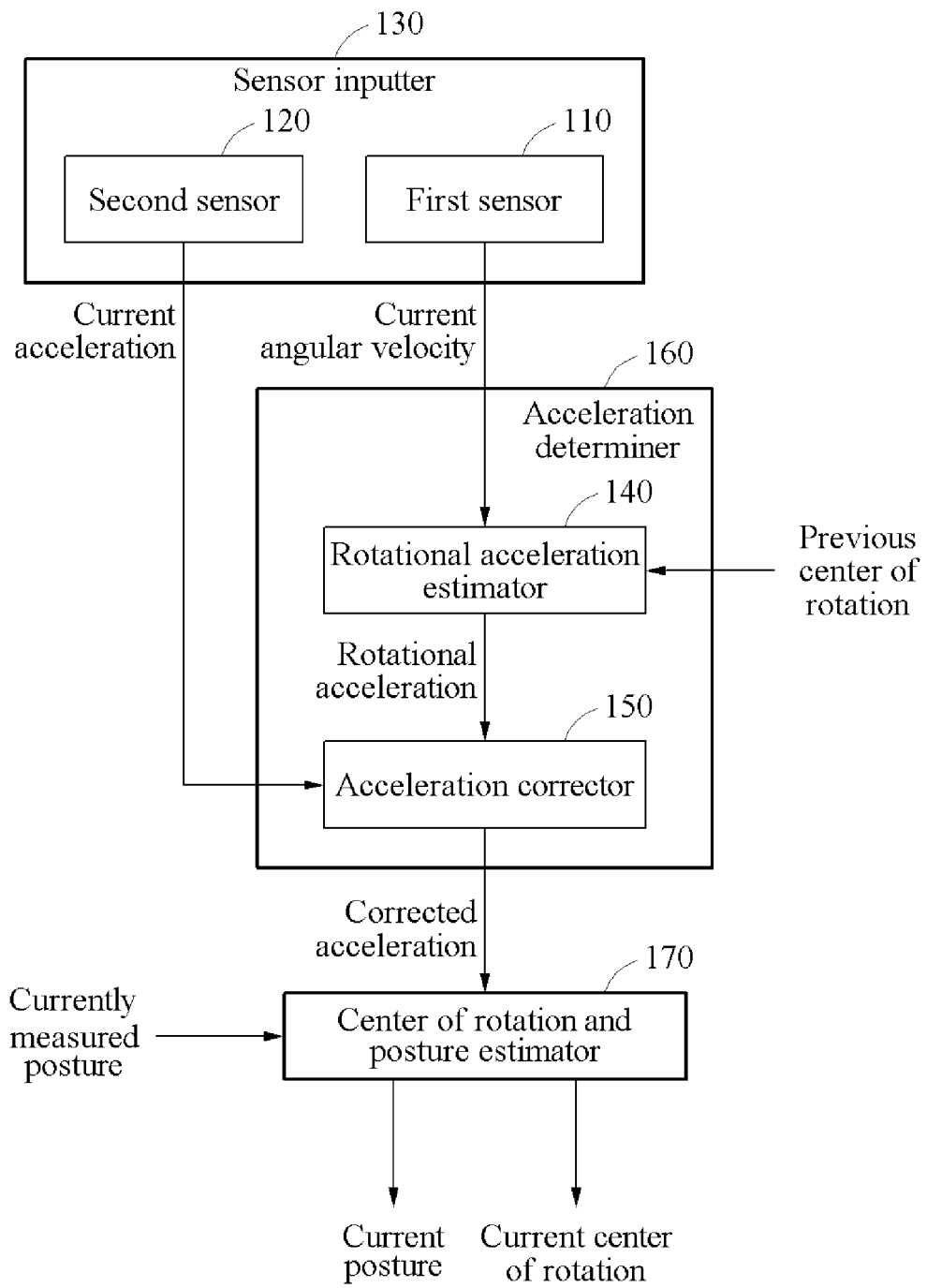
FIG. 1 illustrates an example of a posture estimation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including," when used herein, specify the presence of stated features, integers, operations, elements, and/or components, but do not preclude the presence or addition of one or more other features, integers, operations, elements, components and/or groups thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. In the drawings, like reference numerals are used for like elements.

FIG. 1 illustrates an example of a posture estimation apparatus.

Referring to FIG. 1, a posture estimation apparatus may include an acceleration determiner 160 and a center of rotation and posture estimator 170. Hereinafter, an object of which a posture is to be estimated may be referred to as the object A. The acceleration determiner 160 may estimate a rotational acceleration of the object A of a current timepoint (hereinafter, the rotational acceleration) based on an angular velocity of the object A measured by a first sensor 110 at the current timepoint (hereinafter, the current angular velocity) and a center of rotation of the object A estimated at a previous timepoint (hereinafter, the previous center of rotation). The previous center of rotation may correspond to a center of rotation of the object A estimated by the center of rotation and posture estimator 170 at the previous timepoint. In an example, the posture estimation apparatus of FIG. 1 may be either one or both of a smart phone and a wearable device.

A center of rotation of an object is defined as a point on which the object performs a rotational motion. A rotational acceleration (e.g., a radial acceleration) of the object is defined as a rotation direction component of an acceleration applied to the object. The rotational acceleration is a value defined and used herein, and differs from an angular acceleration. The first sensor 110 may measure an angular velocity. The first sensor 110 may be a gyro sensor.

The acceleration determiner 160 may correct an acceleration of the object A measured by a second sensor 120 at the current timepoint (hereinafter, the current acceleration) based on the estimated rotational acceleration. The acceleration determiner 160 may transmit the corrected acceleration to the center of rotation and posture estimator 170.

The second sensor 120 may measure an acceleration. The second sensor 120 may be an accelerometer.

Hereinafter, for ease of description, examples in which the first sensor 110 and the second sensor 120 are different from each other will be described. However, in some examples, the first sensor 110 and the second sensor 120 may be physically connected to operate as a single sensor such that one sensor measures both an angular velocity and an acceleration, thereby performing the roles of the first sensor 110 and the second sensor 120.

The posture estimation apparatus may further include a sensor inputter 130 including the first sensor 110 and the second sensor 120. In another example, either one or both of the first sensor 110 and the second sensor 120 may be external to the posture estimation apparatus. In an example, the posture estimation apparatus may communicate with the externally-located sensor(s), thereby receiving information measured by the externally-located sensor(s).

In an example, the posture estimation apparatus of the present disclosure may set an interval between a current timepoint and a past timepoint to be small, to more conveniently and more accurately calculate an angular acceleration, which will be described later. Further, in an example, the posture estimation apparatus of the present disclosure may set the interval between the current timepoint and the past timepoint to be small, to more accurately calculate a rotational acceleration based on a previous center of rotation, which will be described later.

The acceleration determiner 160 may include a rotational acceleration estimator 140 and an acceleration corrector 150. The rotational acceleration estimator 140 may estimate a rotational acceleration based on the current angular velocity and the previous center of rotation. The acceleration corrector 150 may correct the current acceleration based on the estimated rotational acceleration.

Figure 3:
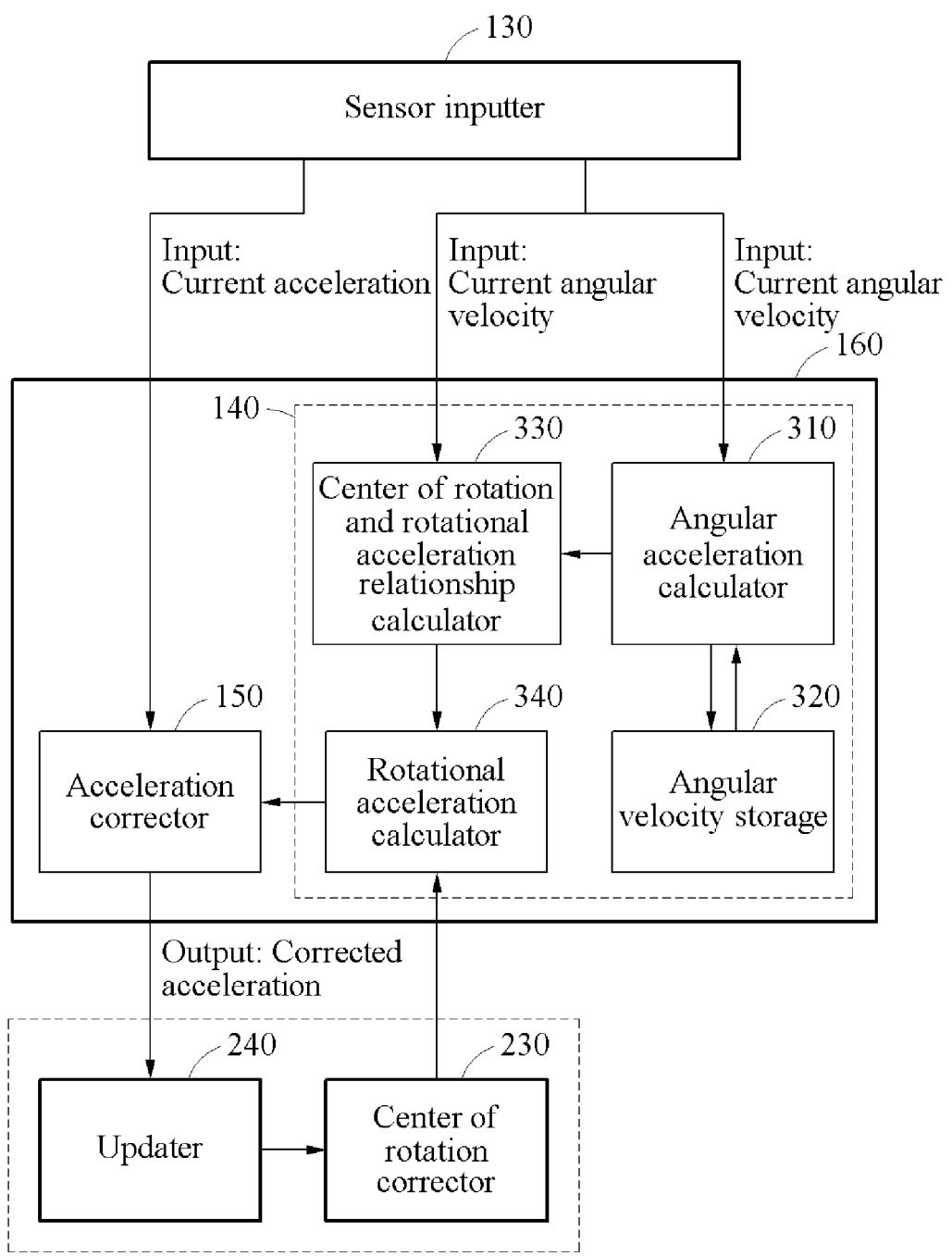
FIG. 3 illustrates an example of an operation of an acceleration determiner.

Non-limiting examples of the operation of the acceleration determiner 160 will be described in detail with reference to FIG. 3. Referring to FIG. 3, the rotational acceleration estimator 140 may include an angular acceleration calculator 310, an angular velocity storage 320, a center of rotation and rotational acceleration relationship calculator 330, and a rotational acceleration calculator 340. The angular acceleration calculator 310 may calculate an angular acceleration of the object A of the current timepoint (hereinafter, the current angular acceleration) based on the current angular velocity and an angular velocity of the object A measured by the first sensor 110 at the previous timepoint (hereinafter, the previous angular velocity). In an example, the angular acceleration calculator 310 may retrieve the previous angular velocity stored in the angular velocity storage 320.

The angular acceleration calculator 310 may calculate the angular acceleration by calculating a variation in the angular velocity over time. In an example, the posture estimation apparatus of the present disclosure may set an interval between a current timepoint and a previous timepoint to be small, such that the calculated angular acceleration (calculated by the angular acceleration calculator 310 by dividing a difference between the current angular velocity and the previous angular velocity by the interval between the current timepoint and the previous timepoint) accurately approximates to an actual angular acceleration (which is a result of differentiating the current angular velocity with respect to time).

Conversely, a typical posture estimation apparatus may set the interval between the current timepoint and the previous timepoint to be large, such that the difference between the actual angular acceleration and the calculated angular acceleration (calculated by dividing the difference between the current angular velocity and the previous angular velocity by the interval between the current timepoint and the previous timepoint) is large, and therefore an accuracy of the calculated angular acceleration may decrease. In an example of the posture estimation apparatus of the present disclosure, to improve upon the inaccuracy of the angular acceleration calculated by the typical posture estimation apparatus, the angular acceleration calculator 310 may calculate the angular acceleration based on an angular velocity measured with respect to a previous timepoint (hereinafter, the timepoint T) with a smaller interval from the current timepoint than the large interval set by the typical posture estimation apparatus. In detail, the angular acceleration calculator 310 may calculate the angular acceleration by dividing the difference between the current angular velocity and the angular velocity measured at the timepoint T by the difference between the current timepoint and the timepoint T.

The angular acceleration calculator 310 may transmit a result of calculating the angular acceleration to the center of rotation and rotational acceleration relationship calculator 330. The center of rotation and rotational acceleration relationship calculator 330 may calculate a relationship between a current center of rotation and a rotational acceleration based on the current angular velocity and the current angular acceleration. The relationship between the current center of rotation and the rotational acceleration may be calculated using Equation 1, for example.

$$H_r = [\alpha_K \times] - [\omega_K \times]^2 \qquad \text{Equation 1}$$

Here, $H_r$ denotes a matrix indicating the relationship between the center of rotation and the rotational acceleration. $\alpha_K$ denotes the current angular acceleration. $\omega_K$ denotes the current angular velocity.

The angular velocity storage 320 may store an angular velocity input from the sensor inputter 130. The angular acceleration calculator 310 may use the current angular velocity stored in the angular velocity storage 320 to calculate an angular acceleration at a subsequent timepoint (that is, a subsequent iteration). In an example, the current angular velocity may be used as a previous angular velocity when calculating the angular acceleration at the subsequent timepoint.

The center of rotation and rotational acceleration relationship calculator 330 may transmit the calculated relationship between the current center of rotation and the rotational acceleration to the rotational acceleration calculator 340. The rotational acceleration calculator 340 may calculate the rotational acceleration based on the current angular velocity, the current angular acceleration, and the previous center of rotation. In another example, the rotational acceleration calculator 340 may calculate the rotational acceleration based on the relationship between the current center of rotation and the rotational acceleration and the previous center of rotation. The previous center of rotation may correspond to a center of rotation estimated by a center of rotation corrector 230 included in the center of rotation and posture estimator 170 at the previous timepoint, which will be described further below.

The rotational acceleration may be determined based on the current angular velocity, the current angular acceleration, and the current center of rotation. A typical posture estimation apparatus may inaccurately determine a current center of rotation at a timepoint at which the rotational acceleration is calculated. However, in an example of the posture estimation apparatus of the present disclosure, when the interval between the current timepoint and the previous timepoint is set to be sufficiently small, the difference between the current calculated center of rotation and the previous calculated center of rotation is small, and thus the previous calculated center of rotation accurately approximates to the current calculated center of rotation. Thus, by setting the interval between the current timepoint and the previous timepoint to be sufficiently small, the posture estimation apparatus of the present disclosure may accurately calculate the rotational acceleration based on the previous center of rotation while minimizing an error.

In an example, the rotational acceleration may be calculated using Equation 2.

$$f_{rot} = -\alpha \times r - \omega \times (\omega \times r) \qquad \text{Equation 2}$$

In Equation 2, $f_{rot}$ denotes the rotational acceleration. r denotes the previous center of rotation.

The rotational acceleration may be expressed based on Equation 1 and Equation 2, as given by Equation 3, for example.

$$f_{rot} = H_r r \qquad \text{Equation 3}$$

Referring to Equation 2, the rotational acceleration calculator 340 may calculate the rotational acceleration based on the current angular velocity, the current angular acceleration, and the previous center of rotation. Referring to Equation 3, the rotational acceleration calculator 340 may calculate the rotational acceleration based on the relationship between the center of rotation and the rotational acceleration and the previous center of rotation.

The rotational acceleration calculator may 340 transmit the calculated rotational acceleration to the acceleration corrector 150. The acceleration corrector 150 may receive the current acceleration and the rotational acceleration, and output a result of correcting the acceleration (hereinafter, the corrected acceleration) by removing a component corresponding to the rotational acceleration among a plurality of components included in the current acceleration. The acceleration corrector 150 transmits the corrected acceleration to the center of rotation and posture estimator 170.

Figure 2:
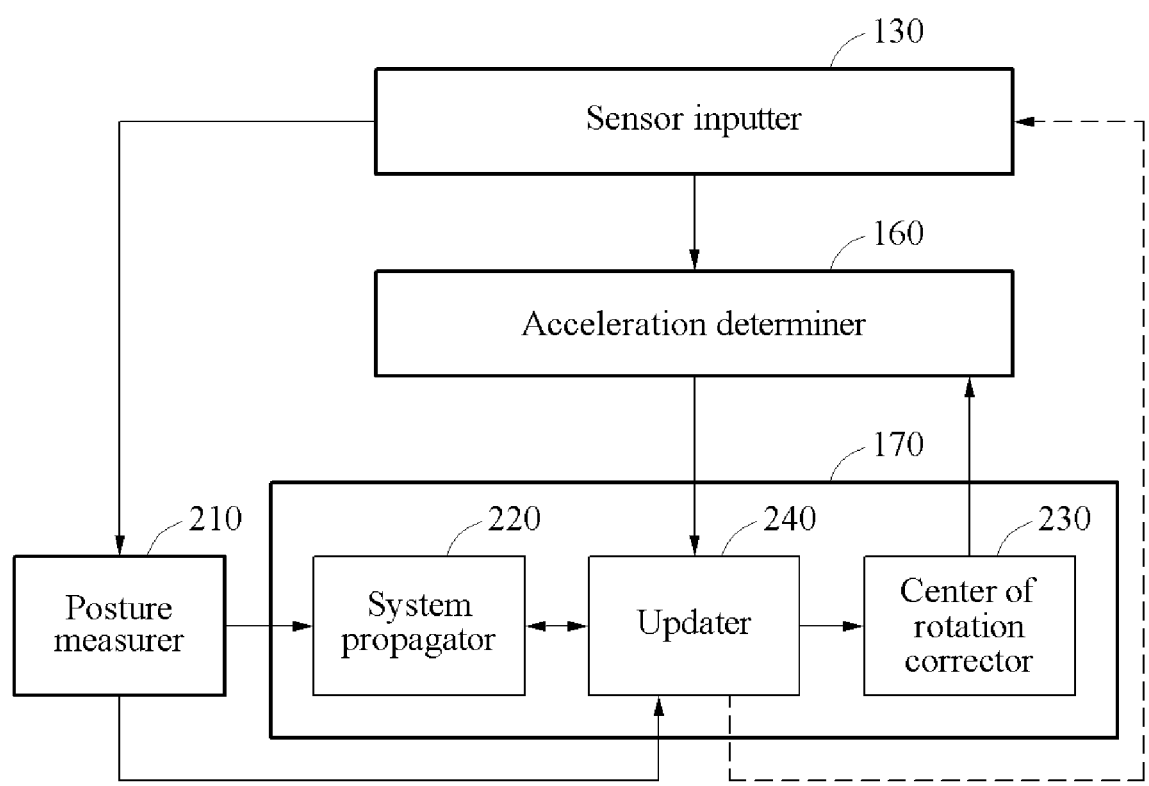
FIG. 2 illustrates an example of a posture estimation apparatus.

The acceleration corrector 150 may transmit the corrected acceleration to an updater 240 of FIG. 2. In an example, the updater 240 of FIG. 2 may correct a posture error of the object A of the current timepoint (hereinafter, the current posture error) and a center of rotation error of the object A of the current timepoint (hereinafter, the current center of rotation error) based on the corrected acceleration, and transmit the corrected current center of rotation error to the center of rotation corrector 230 of FIG. 2. The center of rotation corrector 230 of FIG. 2 may estimate a center of rotation of the object A of the current timepoint (hereinafter, the current center of rotation) by adding the previous center of rotation and the corrected current center of rotation error, and transmit the estimated current center of rotation to the acceleration determiner 160. The center of rotation corrector 230 of FIG. 2 may transmit the estimated current center of rotation to the rotational acceleration calculator 340.

Example operations of the center of rotation corrector 230 and the updater 240 will be described further below with reference to FIGS. 2 and 4.

Referring back to FIG. 1, the acceleration determiner 160 may transmit the corrected acceleration to the center of rotation and posture estimator 170. The center of rotation and posture estimator 170 may estimate or determine the current center of rotation and a posture of the object A of the current timepoint (hereinafter, the current posture) based on the corrected acceleration and a posture of the object A estimated at the current timepoint (hereinafter, the currently estimated posture). In an example, the currently estimated posture may be received from a posture measurer 210 of FIG. 2 of the posture estimation apparatus. In another example, the currently estimated posture may be received from an outside of the posture estimation apparatus. In another example, the currently estimated posture may be received from the sensor inputter 130 of the posture estimation apparatus.

An operation of the posture measurer 210 will be further described further below with reference to FIG. 2, as a non-limiting example.

To estimate/determine the current posture, the center of rotation and posture estimator 170 may estimate/determine the current posture error based on the acceleration corrected by the acceleration determiner 160 and the currently estimated posture. A posture error is defined as a difference between an actual posture at a predetermined timepoint and an estimated or measured posture. For example, the current posture error is defined as a difference between the current posture and the currently estimated posture. The center of rotation and posture estimator 170 may estimate/determine the current posture based on the currently estimated posture and the current posture error. The current posture estimated/determined by the center of rotation and posture estimator 170 may be used by the acceleration determiner 160 at a subsequent timepoint.

To estimate the current center of rotation, the center of rotation and posture estimator 170 may estimate a center of rotation error of the object A of the current timepoint (hereinafter, the current center of rotation error) based on the acceleration corrected by the acceleration determiner 160 and the currently estimated posture. The current center of rotation error is defined as a difference between the current center of rotation and the previous center of rotation. The center of rotation and posture estimator 170 may estimate the current center of rotation based on the current center of rotation error and the previous center of rotation.

An operation of the center of rotation and posture estimator 170 is illustrated in further detail in FIG. 2, as a non-limiting example. Referring to FIG. 2, the posture estimation apparatus may further include the posture measurer 210. In addition, the center of rotation and posture estimator 170 may include a system propagator 220, the updater 240, and the center of rotation corrector 230.

The posture measurer 210 may estimate a posture (currently estimated posture) of the object A based on at least one value measured by the sensor inputter 130. The posture measurer 210 may receive angular velocities from the first sensor 110 included in the sensor inputter 130. In an example, the posture measurer 210 may estimate the currently estimated posture of the object A by integrating the angular velocities received from the first sensor 110. For example, the posture measurer 210 may estimate a current posture of the object A by integrating angular velocities from the previous timepoint to the current timepoint. The estimated current posture of the object A may correspond to the currently estimated posture. The current posture of the object A may be estimated as expressed by Equation 4, for example.

$$S_k = C \int_{t_{K-1}}^{t_K} \omega \, dt \qquad \text{Equation 4:}$$

In Equation 4, $S_K$ denotes the currently estimated posture of the object A. t denotes a time. $t_{K-1}$ denotes a time value corresponding to the previous timepoint. $t_K$ denotes a time value corresponding to the current timepoint. $\omega$ denotes the angular velocity. C denotes a constant corresponding to a relationship between a result of integrating the angular velocities and the posture.

The system propagator 220 may predict the current posture error and the current center of rotation error from a posture error of the object A estimated at the previous timepoint (hereinafter, the previous posture error) and a center of rotation error of the object A estimated at the previous timepoint (hereinafter, the previous center of rotation error) based on the currently estimated posture. The system propagator 220 may propagate a previous state including the previous posture error and the previous center of rotation error to a current state including the current posture error and the current center of rotation error based on a Kalman filter based system model. The propagation may be performed using Equation 5, for example.

$$\hat{x}_k^- = \Phi_{k-1} \hat{x}_{k-1}^+ + w_{k-1} \qquad \text{Equation 5:}$$

Here, $x_k^-$ denotes a state of a k-th timepoint. $\phi_{k-1}$ a propagation matrix of a (k−1)-th timepoint. $\hat{x}_{k-1}^+$ denotes a state of the (k−1)-th timepoint. $w_{k-1}$ denotes an external control value at the (k−1)-th timepoint. The state of the k-th timepoint corresponds to the current state, and the state of the (k−1)-th timepoint corresponds to the previous state.

$\phi_a$ may be expressed by Equation 6, for example.

$$\Phi_a = \begin{bmatrix} I_{3\times3} & C_b^n \Delta t \\ 0_{3\times2} & I_{3\times3} \end{bmatrix} \qquad \text{Equation 6}$$

In Equation 6, $C_b^n$ denotes the posture of the object A. $\Delta t$ denotes a time interval between an a-th state and an (a−1)-th state. When a corresponds to k, $\Delta t$ corresponds to the time interval between the current timepoint and the previous timepoint, and $C_b^n$ corresponds to a posture obtainable by integrating angular velocities measured between the current timepoint and the previous timepoint.

A state x may be expressed as given by Equation 7, for example.

$$x = [\delta\varnothing \delta\theta \delta\psi \delta b_{g,x} \delta b_{g,y} \delta b_{g,z} \delta r_x \delta r_y \delta r_z]. \qquad \text{Equation 7:}$$

In Equation 7, (δØδθδψ) corresponds to the posture error of the object A, ($\delta b_{g,x}, \delta b_{g,y}, \delta b_{g,z}$) corresponds to a gyro bias error of the first sensor 110, and ($\delta r_x, \delta r_y, \delta r_z$) corresponds to the center of rotation error of the object A. However, in an example, the gyro bias error may be negligible, and thus the state x may be expressed without the gyro bias error.

The updater 240 may receive the corrected acceleration output from the acceleration corrector 150. The updater 240 may correct the current posture error and the current center of rotation error predicted by the system propagator 220 based on the corrected acceleration and the currently estimated posture. The current posture error and the current center of rotation error may be estimated through the prediction process of the system propagator 220 and the correction process of the updater 240. The current posture error and the current center of rotation error may be estimated using an acceleration error, and the acceleration error may be calculated using Equation 8, for example.

$$z = f_{meas} - \hat{C}_n^b g^T = (f_{ext} + f_{rot} + \hat{C}_n^b g) - \hat{C}_n^b g^T. \quad \text{Equation 8:}$$

In Equation 8, z denotes the acceleration error. $f_{meas}$ denotes an acceleration applied to the object and measured by the second sensor 120. $f_{ext}$ denotes an acceleration component measured by an external force of a rectilinear direction, excluding a gravity in the measured acceleration. $f_{rot}$ denotes an acceleration component measured by an external force of a rotational direction. $\hat{C}_n^b g$ denotes an acceleration component measured by the gravity. $\hat{C}_n^b g^T$ may be calculated by a product of a gravity acceleration and a matrix corresponding to the posture obtainable by integrating the angular velocities measured between the current timepoint and the previous timepoint.

The updater 240 may transmit the estimated current posture error to the system propagator 220. The system propagator 220 may estimates a current posture based on a result of correcting the current posture error. For example, the system propagator 220 may estimate the current posture by adding the currently estimated posture and the estimated current posture error.

The updater 240 may transmit the estimated current center of rotation error to the center of rotation corrector 230. The center of rotation corrector 230 may estimate a current center of rotation based on a result of estimating the current center of rotation error. In detail, the center of rotation corrector 230 may estimate the current center of rotation by adding the previous center of rotation and the estimated current center of rotation error.

The center of rotation corrector 230 may transmit the estimated current center of rotation to the acceleration determiner 160. The acceleration determiner 160 may use the estimated current center of rotation at a subsequent timepoint (that is, a subsequent iteration). In an example, the center of rotation may be used as a previous center of rotation at the subsequent timepoint. The current center of rotation estimated by the rotational acceleration calculator 340 included in the acceleration determiner 160 may be received and used.

Figure 4:
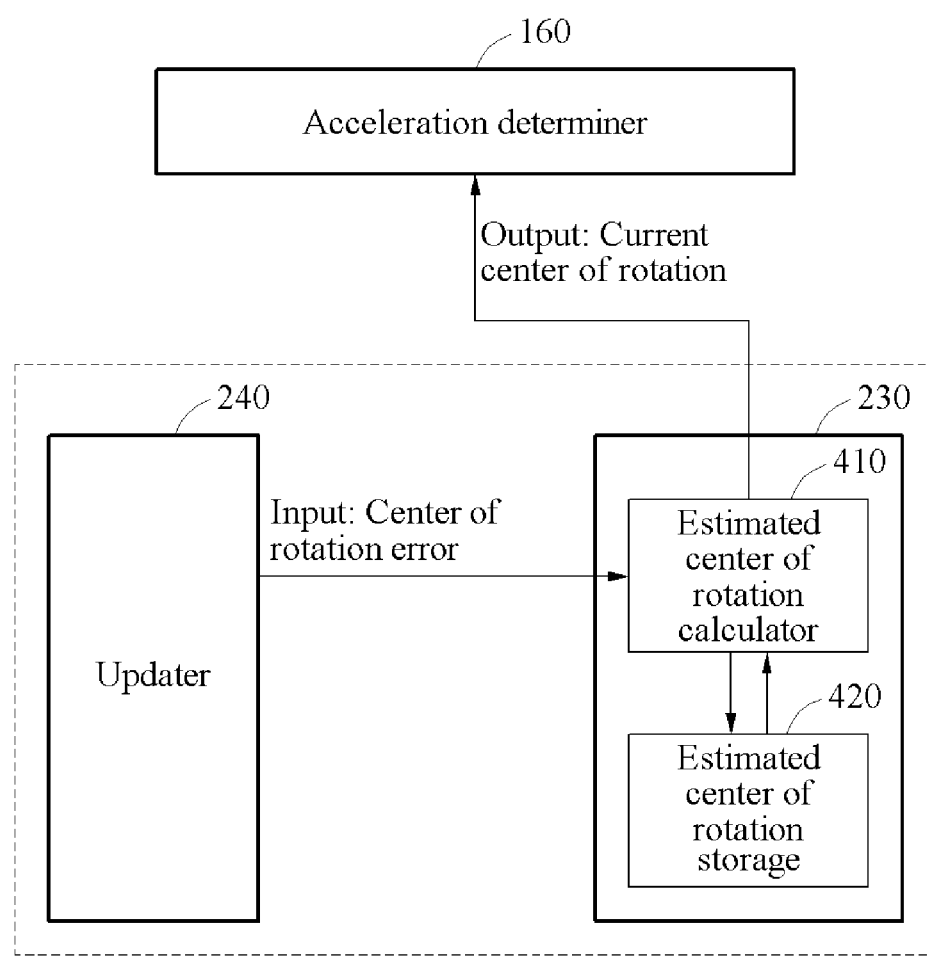
FIG. 4 illustrates an example of an operation of a center of rotation corrector.

An operation of the center of rotation corrector 230 is illustrated in further detail in FIG. 4, as a non-limiting example. Referring to FIG. 4, the center of rotation corrector 230 may include an estimated center of rotation calculator 410 and an estimated center of rotation storage 420. The estimated center of rotation calculator 410 may receive an estimated current center of rotation error from the updater 240. Further, the estimated center of rotation calculator 410 may retrieve a previous center of rotation stored in the estimated center of rotation storage 420. The estimated center of rotation calculator 410 may estimate a current center of rotation by adding the previous center of rotation and the estimated current center of rotation error. The estimated center of rotation calculator 410 may transmit the estimated current center of rotation to the acceleration determiner 160.

The estimated center of rotation storage 420 may store the current center of rotation estimated by the estimated center of rotation calculator 410. The estimated center of rotation calculator 410 may use the estimated current center of rotation at a subsequent timepoint, that is, a subsequent iteration. In an example, the center of rotation may be used as a previous center of rotation at the subsequent timepoint.

Referring back to FIG. 2, the system propagator 220 may further estimate a bias error of the first sensor 110 of the current timepoint based on the current angular velocity. In an example, the updater 240 may further correct the estimated gyro bias error of the first sensor 110 of the current timepoint. Further, the updater may 240 transmit, to the sensor inputter 130, the estimated gyro bias error of the first sensor 110 of the current timepoint. A value of the angular velocity measured by the first sensor 110 included in the sensor inputter 130 may be corrected based on the estimated gyro bias error.

While a typical posture estimation method and apparatus may require the use of two or more inertial sensors (e.g., two or more gyro sensors) to estimate a posture, a posture may be accurately estimated by a posture estimation method and apparatus of the present disclosure using a single inertial sensor (e.g., a gyro sensor) in a dynamic status in which the inertial sensor moves. In particular, a posture estimation performance of the posture estimation method and apparatus of the present disclosure is improved in a high maneuver situation compared to the typical posture estimation method and apparatus.

Figure 5:
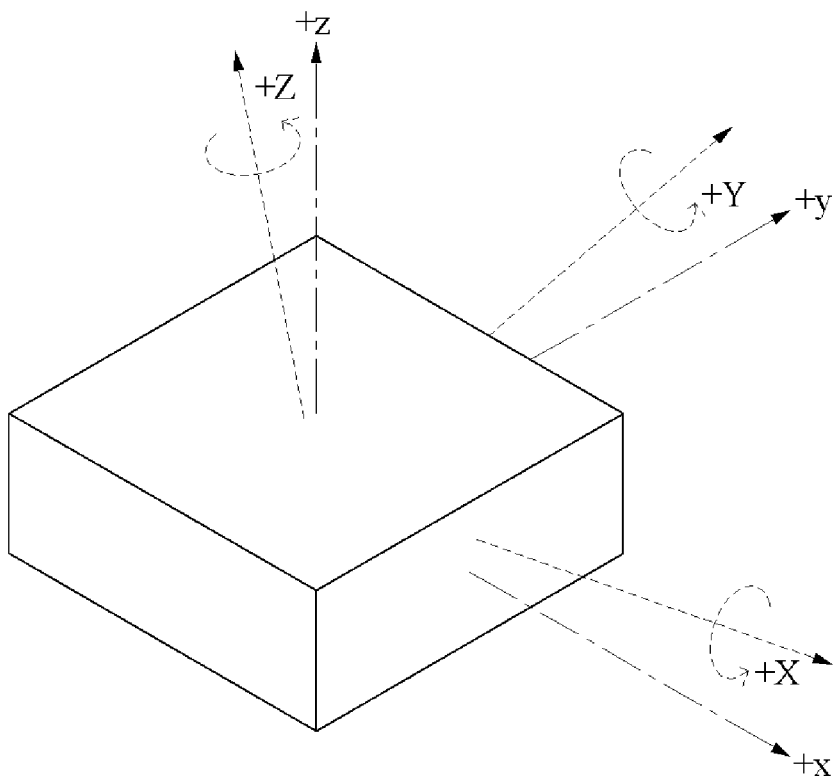
FIG. 5 illustrates an example of operations of a first sensor and a second sensor.

FIG. 5 illustrates an example of operations of a first sensor and a second sensor.

Referring to FIG. 5, a first sensor 520 may measure an angular velocity, and a second sensor 510 may measure an acceleration. The first sensor 520 may correspond to the first sensor 110 of FIG. 1. The second sensor 510 may correspond to the second sensor 120 of FIG. 1.

The first sensor 520 may be a gyro sensor. In an example, the first sensor 520 may sense a rotational motion of an object with respect to axes X, Y, and Z, and measure an angular velocity generated by the rotational motion. The first sensor 520 may measure the angular velocity by converting a Coriolis force generated by the rotational motion into an electrical signal. In another example, the first sensor 520 may measure angular accelerations by rotating an internal motor, and measure the angular velocity and an angle by integrating the measured angular accelerations. In another example, the first sensor 520 may measure the angular velocity by measuring a phase difference of light by the Sagnac effect using an interference effect of light.

An angular acceleration of an object A may be calculated based on angular velocities measured by the first sensor 520. Further, a posture of the object A may be measured based on the angular velocities measured by the first sensor 520. Non-limiting examples of measuring the angular acceleration of the object A and measuring the posture of the object A have been described in detail above with reference to FIGS. 1 through 4.

The second sensor 510 may be an accelerometer. In an example, the second sensor 510 may measure an acceleration with respect to x-axial, y-axial, and z-axial directions. The accelerometer in a stationary state may sense an acceleration of a gravity direction and thus, measure an acceleration of −g (gravitational acceleration) in the z-axial direction.

In a typical posture estimation method and apparatus, when rotation axes for the first sensor 520 to sense a rotational motion of an object are set to match axes for the second sensor 510 to measure an acceleration, a measurement error caused by axis misalignment may occur. Thus, in the posture estimation method and apparatus of the present disclosure, rotation axes X, Y, and Z for the first sensor 520 to sense the rotational motion of the object and axes x, y, and z for the second sensor 510 to measure the acceleration may be set to not match each other, such that the measurement error is advantageously prevented.

The posture of the object A may be corrected based on the acceleration measured by the second sensor 510. Non-limiting examples of correcting the posture of the object A have been described in detail above with reference to FIGS. 1 through 4.

Figure 6A:
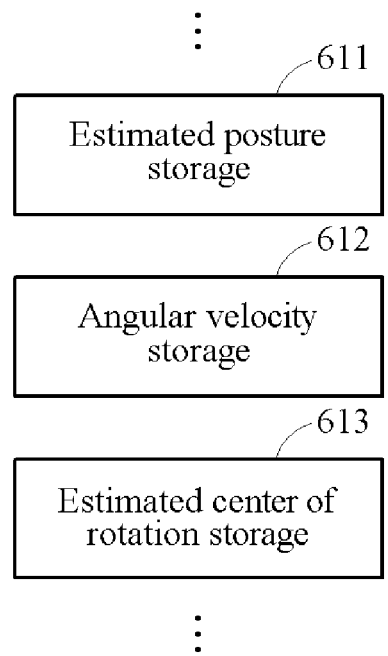
FIGS. 6A and 6B illustrate examples of storing information in a posture estimation apparatus.
Figure 6B:
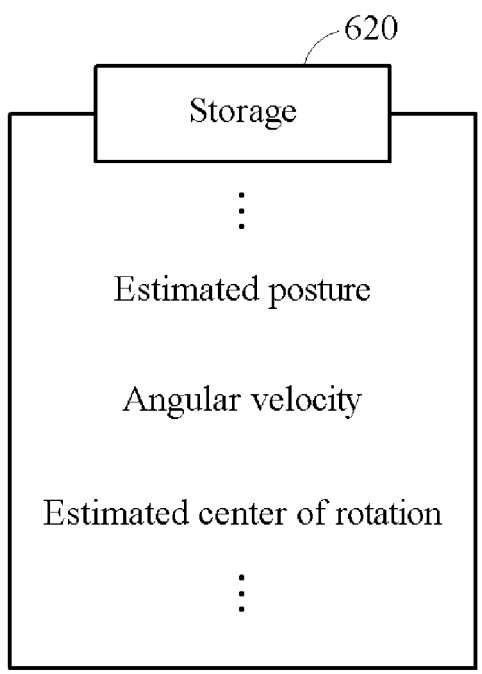

FIGS. 6A and 6B illustrate examples of storing information in a posture estimation apparatus.

Referring to FIGS. 6A and 6B, a posture estimation apparatus may store information to perform a series of processes for posture estimation. For example, the posture estimation apparatus may store an estimated posture, a measured angular velocity, and an estimated center of rotation.

Referring to FIG. 6A, the posture estimation apparatus may use one or more storages to store the information. The posture estimation apparatus may use different types of storages to store different types of information. For example, the posture estimation apparatus may store the estimated posture in an estimated posture storage 611, store the measured angular velocity in an angular velocity storage 612, and store the estimated center of rotation in an estimated center of rotation storage 613. In an example, the estimated posture storage 611 may be included in the system propagator 220 of FIG. 2. The angular velocity storage 612 may correspond to the angular velocity storage 320 of FIG. 3. The estimated center of rotation storage 613 may correspond to the estimated center of rotation storage 420 of FIG. 4.

Referring to FIG. 6B, the posture estimation apparatus may store the information in a single storage. For example, the posture estimation apparatus may store the estimated posture, the measured angular velocity, and the estimated center of rotation in the common storage 620.

The examples of FIGS. 6A and 6B are illustratively provided. A method of storing information in the posture estimation apparatus is not limited to the example of FIG. 6A or the example of FIG. 6B. For example, the posture estimation apparatus may store the estimated posture and the estimated center of rotation together in one storage, and stores the estimated angular velocity in another storage. In another example, the posture estimation apparatus may store the estimated posture, the measured angular velocity, and the estimated center of rotation in a memory. In an example, the memory is a volatile memory or a non-volatile memory.

Figure 7:
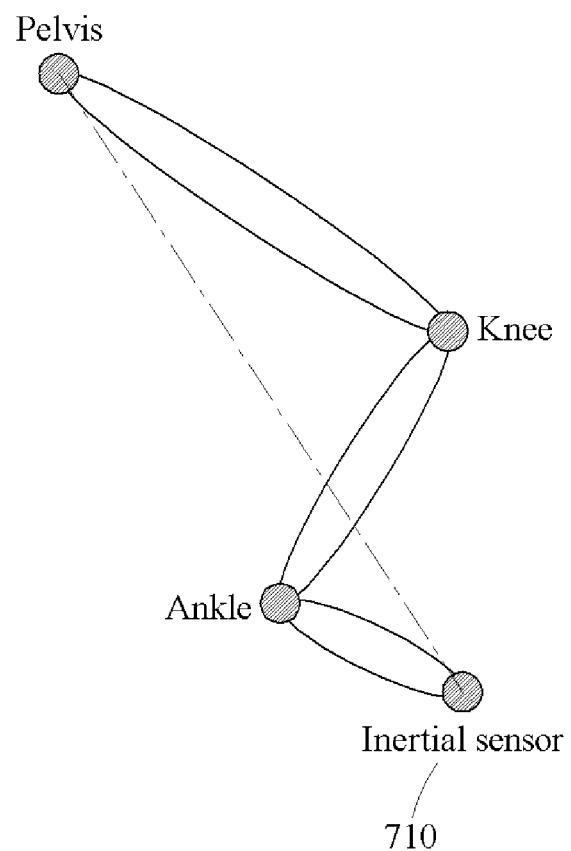
FIG. 7 illustrates an example of a posture estimation method.

FIG. 7 illustrates an example of a posture estimation method.

Referring to FIG. 7, an object A of which a posture is to be estimated may correspond to a human body. The human body may perform a motion based on connections between various joints such as a pelvis, a knee, and an ankle. In detail, the motion of the human body may be physically interpreted as a rotational motion about a joint. In view of such a principle of human motion, an acceleration disturbance in a dynamic status may be effectively eliminated by correcting the acceleration of the object A based on the rotational acceleration. Thus, when the posture estimation methods and apparatuses of the present disclosure may estimate the posture of the object A using one inertial sensor 710 in the dynamic status in which the inertial sensor moves, without requiring the use of two or more inertial sensors as in typical posture estimation methods and apparatuses. In an example, the inertial sensor 710 may be a gyro sensor and may correspond to the first sensor 110 of FIG. 1.

Figure 8:
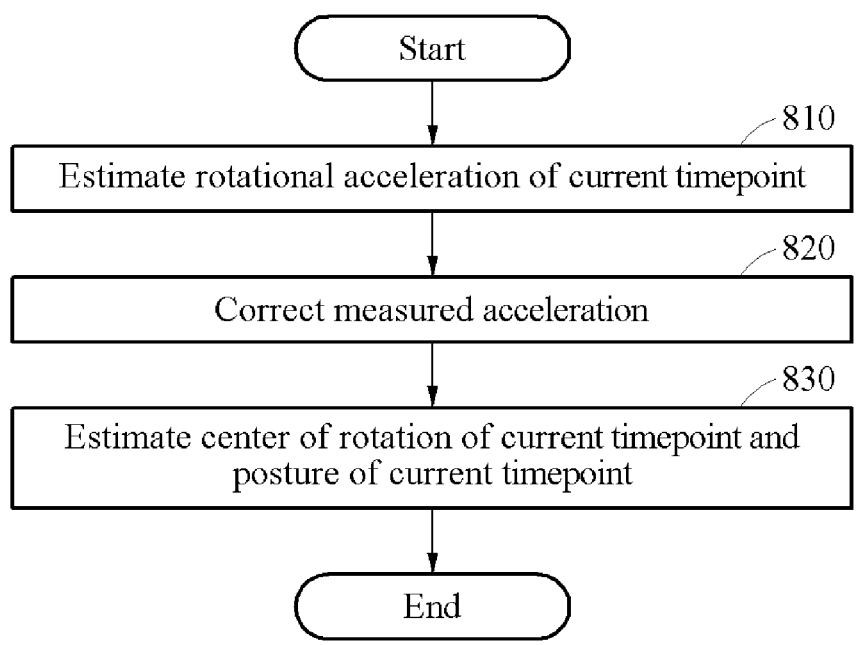
FIG. 8 illustrates an example of a posture estimation method.

FIG. 8 illustrates an example of a posture estimation method.

Referring to FIG. 8, in operation 810, a posture estimation apparatus may estimate a rotational acceleration of a current timepoint based on an angular velocity measured by a first sensor at the current timepoint and a center of rotation estimated at a previous timepoint. The first sensor may correspond to the first sensor 110 of FIG. 1. The angular velocity measured by the first sensor at the current timepoint may correspond to the current angular velocity of FIG. 1. The center of rotation estimated at the previous timepoint may correspond to the previous center of rotation of FIG. 1. The rotational acceleration of the current timepoint may correspond to the rotational acceleration of FIG. 1.

In operation 820, the posture estimation apparatus may correct an acceleration measured by a second sensor at the current timepoint based on the estimated rotational acceleration. The second sensor may correspond to the second sensor 120 of FIG. 1. The acceleration measured by the second sensor at the current timepoint may correspond to the current acceleration of FIG. 1.

In operation 830, the posture estimation apparatus may estimate a center of rotation of the current timepoint and a posture of the current timepoint based on the corrected acceleration and a posture measured at the current timepoint. The posture measured at the current timepoint may correspond to the currently estimated posture of FIG. 1. The center of rotation of the current timepoint may correspond to the current center of rotation of FIG. 1. The posture of the current timepoint may correspond to the current posture of FIG. 1.

The posture estimation apparatuses, first sensors, second sensors, sensor inputters, acceleration estimators, acceleration correctors, acceleration determiners, posture estimators, posture measurers, system propagators, center of rotation correctors, updaters, angular acceleration calculators, angular velocity storages, center of rotation and rotational acceleration relationship calculators, rotational acceleration calculators, estimated center of rotation calculators, estimated center of rotation storages, second sensors, first sensors, estimated posture storages, angular velocity storages, estimated center of rotation storages, inertial sensors, first sensor 110, second sensor 120, sensor inputter 130, acceleration estimator 140, acceleration corrector 150, acceleration determiner 160, posture estimator 170, posture measurer 210, system propagator 220, center of rotation corrector 230, updater 240, angular acceleration calculator 310, angular velocity storage 320, center of rotation and rotational acceleration relationship calculator 330, rotational acceleration calculator 340, estimated center of rotation calculator 410, estimated center of rotation storage 420, second sensor 510, first sensor 520, estimated posture storage 611, angular velocity storage 612, estimated center of rotation storage 613, inertial sensor 710, and other apparatuses, modules, devices, and other components described herein with respect to FIGS. 1-8 are implemented by hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented angular displacement posture determination method, comprising:
estimating a rotational acceleration of a timepoint based on an angular velocity measured by a first sensor at the timepoint and a determined center of rotation of a previous timepoint;
correcting an acceleration measured by a second sensor at the timepoint based on the rotational acceleration; and
determining a center of rotation of the timepoint and a posture of the timepoint based on the corrected acceleration and an estimated posture of the timepoint.

2. The method of claim 1, wherein the determining of the posture of the timepoint comprises:
estimating a posture error of the timepoint based on the corrected acceleration and the estimated posture; and
determining the posture of the timepoint based on the estimated posture and the estimated posture error.

3. The method of claim 1, wherein the determining of the center of rotation of the timepoint comprises:
estimating a center of rotation error of the timepoint based on the corrected acceleration and the estimated posture; and
determining the center of rotation of the timepoint based on the estimated center of rotation error.

4. The method of claim 1, wherein the determining of the center of rotation of the timepoint and the posture of the timepoint comprises:
predicting a posture error of the timepoint and a center of rotation error of the timepoint from a posture error estimated at the previous timepoint and a center of rotation error estimated at the previous timepoint, based on the estimated posture of the timepoint;
correcting the predicted posture error of the timepoint and the predicted center of rotation error of the timepoint based on the corrected acceleration and the estimated posture of the timepoint; and
determining the posture of the timepoint based on the corrected posture error, and the center of rotation of the timepoint based on the corrected center of rotation error.

5. The method of claim 4, wherein the predicting comprises propagating a previous state including the posture error of the previous timepoint and the center of rotation error of the previous timepoint to a state including the posture error of the timepoint and the center of rotation error of the timepoint based on a Kalman filter based system model.

6. The method of claim 1, further comprising:
estimating the estimated posture of the timepoint by integrating angular velocities measured by the first sensor between the previous timepoint and the timepoint.

7. The method of claim 1, wherein the estimating of the rotational acceleration of the timepoint comprises:
calculating an angular acceleration of the timepoint based on the angular velocity measured at the timepoint and an angular velocity measured at the previous timepoint; and
estimating the rotational acceleration of the timepoint based on the angular velocity measured at the timepoint, the angular acceleration of the timepoint, and the center of rotation of the previous timepoint.

8. The method of claim 1, wherein the estimating of the rotational acceleration of the timepoint comprises retrieving, from a memory, either one or both of the determined center of rotation of the previous timepoint and an angular velocity measured by the first sensor at the previous timepoint.

9. The method of claim 1, wherein the rotational acceleration is an estimated rotation direction component of the acceleration measured by the second sensor at the timepoint.

10. The method of claim 1, wherein the correcting comprises removing a component corresponding to the rotational acceleration from among a plurality of components included in the acceleration measured at the timepoint.

11. The method of claim 1, wherein the first sensor includes a gyro sensor, and the second sensor includes an accelerometer.

12. A non-transitory computer-readable storage medium storing instructions that, when executed by one or more processors, configure the one or more processors to perform the method of claim 1.

13. An angular displacement posture estimation apparatus, comprising:
one or more processors configured to:
estimate a rotational acceleration of a timepoint based on an angular velocity measured by a first sensor at the timepoint and a determined center of rotation of a previous timepoint,
correct an acceleration measured by a second sensor at the timepoint based on the rotational acceleration, and
determine a center of rotation of the timepoint and a posture of the timepoint based on the corrected acceleration and an estimated posture of the timepoint.

14. The apparatus of claim 13, wherein, for the determining of the posture of the timepoint, the one or more processors are configured to:
estimate a posture error of the timepoint based on the corrected acceleration and the estimated posture; and
determine the posture of the timepoint based on the estimated posture and the estimated posture error.

15. The apparatus of claim 13, wherein, for the determining of the center of rotation of the timepoint, the one or more processors are configured to:
estimate a center of rotation error of the timepoint based on the corrected acceleration and the estimated posture; and
determine the center of rotation of the timepoint based on the estimated center of rotation error.

16. The apparatus of claim 13, wherein, for the estimating of the center of rotation of the timepoint and the posture of the timepoint, the one or more processors are configured to:
predict a posture error of the timepoint and a center of rotation error of the timepoint from a posture error estimated at the previous timepoint and a center of rotation error estimated at the previous timepoint, based on the posture measured at the timepoint;
correct the predicted posture error of the timepoint and the predicted center of rotation error of the timepoint based on the corrected acceleration and the estimated posture of the timepoint; and
determine the posture of the timepoint based on the corrected posture error, and the center of rotation of the timepoint based on the corrected center of rotation error.

17. The apparatus of claim 16, wherein, for the predicting, the one or more processors are configured to propagate a previous state including the posture error of the previous timepoint and the center of rotation error of the previous timepoint to a state including the posture error of the timepoint and the center of rotation error of the timepoint based on a Kalman filter based system model.

18. The apparatus of claim 13, wherein the one or more processors are configured to estimate the estimated posture of the timepoint by integrating angular velocities measured by the first sensor between the previous timepoint and the timepoint.

19. The apparatus of claim 13, wherein, for the estimating of the rotational acceleration of the timepoint, the one or more processors are configured to:
- calculate an angular acceleration of the timepoint based on the angular velocity measured at the timepoint and an angular velocity measured at the previous timepoint; and
- estimate the rotational acceleration of the timepoint based on the angular velocity measured at the timepoint, the angular acceleration of the timepoint, and the center of rotation of the previous timepoint.

20. The apparatus of claim 13, wherein, for the estimating of the rotational acceleration of the timepoint, the one or more processors are configured to retrieve, from a memory, either one or both of the center of rotation estimated at the previous timepoint and an angular velocity measured by the first sensor at the previous timepoint.

21. The apparatus of claim 13, wherein, for the correcting, the one or more processors are configured to remove a component corresponding to the rotational acceleration from among a plurality of components included in the acceleration measured at the timepoint.

22. The apparatus of claim 13, wherein the apparatus includes the first sensor and the second sensor, the first sensor includes a gyro sensor, and the second sensor includes an accelerometer.

23. The apparatus of claim 13, wherein the apparatus is either one or both of a smart phone and a wearable device, and the one or more processors are configured to control a function of the apparatus based on the determined center of rotation and posture of the timepoint.

24. The apparatus of claim 13, further comprising a memory storing instructions that, when executed by the one or more processors, configure the one or more processors to perform the estimating of the rotational acceleration, the correcting of the acceleration, and the determining of the center of rotation and the posture of the timepoint.

25. A processor-implemented angular displacement posture estimation method, comprising:
- determining a center of rotation of an object at a first timepoint;
- determining an acceleration of the object at the second timepoint based on the determined center of rotation, an angular velocity of the object at the second timepoint measured by a first sensor, and an acceleration of the object at the second timepoint measured by a second sensor; and
- determining a center of rotation of the object at the second timepoint based on the determined acceleration.

* * * * *